United States Patent
Akilov et al.

(10) Patent No.: US 6,665,734 B1
(45) Date of Patent: Dec. 16, 2003

(54) BLENDING OBJECT-ORIENTED OBJECTS WITH TRADITIONAL PROGRAMMING LANGUAGES

(75) Inventors: Alex Abraham Akilov, Raleigh, NC (US); Tuyet Diem Huynh, Apex, NC (US); Anthony Hayden Lindsey, Fuquay Varina, NC (US); Beth Bridgers Lindsey, Fuquay Varina, NC (US); Timothy Wilson, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 09/666,849

(22) Filed: Sep. 21, 2000

(51) Int. Cl.[7] .................................................. G06F 9/46
(52) U.S. Cl. ....................... 709/318; 709/313; 709/314; 709/315; 709/316; 709/317; 709/328
(58) Field of Search ................................ 709/313–318, 709/328, 329

(56) References Cited

U.S. PATENT DOCUMENTS

| | | | | |
|---|---|---|---|---|
| 5,179,702 A | | 1/1993 | Spix et al. .................. | 395/650 |
| 5,363,501 A | | 11/1994 | Pullela ....................... | 395/500 |
| 5,404,519 A | * | 4/1995 | Denio ......................... | 709/328 |
| 5,475,843 A | | 12/1995 | Halviatti et al. ............ | 395/700 |
| 5,611,043 A | | 3/1997 | Even et al. ................. | 395/575 |
| 5,671,351 A | | 9/1997 | Wild et al. ............. | 385/183.14 |
| 5,727,212 A | * | 3/1998 | Dinallo ........................ | 709/321 |
| 5,805,892 A | | 9/1998 | Nakajima .................... | 395/704 |
| 5,943,657 A | * | 8/1999 | Freestone et al. ........... | 705/400 |
| 6,351,778 B1 | * | 2/2002 | Orton et al. ................. | 709/310 |

OTHER PUBLICATIONS

Lindsey et al., Bridging traditional and object technologies: Creating transitional applications, 1997, IBM Systems Journal, vol. 36, No. 1.*

* cited by examiner

Primary Examiner—John Follansbee
Assistant Examiner—Diem Cao
(74) Attorney, Agent, or Firm—Gregory M. Doudnikoff; Marcia L. Doubet

(57) ABSTRACT

The present invention provides a method, system, and computer program product for blending object-oriented (OO) programming languages with traditional (non-OO) programming languages such that they can execute and share data in a coordinated and integrated manner. Occurrence of a special keyword construct within a non-OO function triggers invocation of an OO method or script, the name of which is preferably specified as a parameter. The OO script executes synchronously, returning control to the non-OO function upon completion. The disclosed technique enables OO scripts to provide a more natural, logical interface to users wherein results of the non-OO function may be provided when most appropriate to the logic being executed, rather than requiring the non-OO function to be artificially designed as in prior art systems which must account for the limitations of their non-integrated execution environment.

24 Claims, 6 Drawing Sheets

Customer

Name: | Mary | *310*
Age: | 199 | *320*

*301* Update    Cancel

UPDATE_FUNCTION - Function Editor

File  Edit  View  Define  Tools  Help

;Validate User input in Customer Record

405 IF CUSTOMER.AGE < 0
410 OR CUSTOMER.AGE > 130;
415 MOVE "Age_Field" TO CUSTOMER.FIELD;
420 MOVE "Age is Invalid" TO CUSTOMER.MESSSAGE;
425 EZESCRPT("displayError");
430 END;

435 IF CUSTOMER.NAME IS BLANK;
440 MOVE "Name_Field" TO CUSTOMER.FIELD;
445 MOVE "Name is Invalid" TO CUSTOMER.MESSSAGE;
450 EZESCRPT("displayError");
455 END;

FIG. 4B

```
CustomerUpdateGUI - Script Editor                               _ □ ×
File  Edit  View  Class  Categories  Methods  Info  Breakpoints  Help Object Scripts              | displayError
                            |
                            |
                            |
                            |
     instance               |          public displayError
"Set in-error field's background to red, invoke message prompter"
|fieldInError messageText| fieldInError := (self subpartNamed: 'CUSTOMER') abtAtAttribute: #'FIELD data'.   460
messageText := (self subpartNamed: 'CUSTOMER') abtAtAttribute: #'MESSAGE data   465

(self subpartNamed: fieldInError) backgroundColor: 'red'.                  470
(self subpartNamed: 'Message Prompter1') messageString: messageText.   475
(self subpartNamed: 'Message Prompter1') prompt.                       480

(3/31/00 12:01:47 PM) from BethGuiTestApp in 'Object Scripts'          source
```

BLENDING OBJECT-ORIENTED OBJECTS WITH TRADITIONAL PROGRAMMING LANGUAGES

RELATED INVENTIONS

The present invention is related to Ser. No. 09/666,442, which is entitled "Synchronous Execution of Object-Oriented Scripts and Procedural Code from within an Interactive Test Facility" (hereinafter referred to as the "first related invention"), and Ser. No. 09/667,153, which is entitled "Manipulation of an Object-Oriented User Interface Process to Provide Rollback of Object-Oriented Scripts from a Procedural Business Logic Debugger", both of which are commonly assigned to the International Business Machines Corporation ("IBM") and were filed concurrently herewith, and which are hereby incorporated herein by reference.

BACKGROUND OF THE INVENTION

1. Field of the Invention

The present invention relates to computer software, and deals more particularly with a method, system, and computer program product for blending object-oriented programming languages with traditional programming languages such that they can execute and share data in a coordinated and integrated manner.

2. Description of the Related Art

Many modern program development environments include both object-oriented (OO) components and traditional non-object-oriented (non-OO) or procedural programming language constructs. The OO components are often used in the user interface. They may also be the main data objects that describe the business system (e.g. Customer objects, Order objects, and so forth in a customer ordering application). The business logic of the application, however, might not be written using an OO language, but might be written instead in a more traditional procedural programming language. It might even be legacy code that only uses OO objects by introduction of a new graphical user interface (GUI). The OO and procedural constructs might even use two completely different namespaces.

A problem arises when developers need to merge the OO and non-OO technologies in a productive way. When application environments include a mix of OO objects and non-OO programming language constructs, there is typically no efficient way for the business logic written in the non-OO programming language to interface with and manipulate the OO objects without interrupting the flow of the business logic.

The problem of integrating OO and non-OO languages was discussed in "Bridging traditional and object technologies: Creating transitional applications", A. H. Lindsey and P. R. Hoffman, *IBM Systems Journal*, Vol. 36, No. 1, (1997), which focuses on rapid application development using visual programming and object-oriented techniques. The section titled "Part and Object Scripting from within Traditional Languages" discusses the need to provide access to visual parts from within non-OO code. The approach described therein is to introduce an "object handle" into the non-OO code namespace, and then to provide addressability to objects in the GUI namespace using instances of object handles to (1) get to parts on the GUI, and (2) get to other OO objects. This approach was intended to enable sending messages to parts or objects, passing arguments, and signaling events that the part or object understood.

The disclosed solution had a number of problems in actual implementation, however. First, it was very complicated, leading to even more difficulties for developers attempting to "bridge the gap" between OO and traditional programming. In addition, the object handle concept did not fit well into the non-OO data item concepts, where a number of the concepts used in the OO world (null values, etc.) do not typically exist. Furthermore, the built-in functions described in the disclosed solution required developers to code complicated data conversion techniques in order to pass arguments of the proper type.

There have been other attempts to bridge this gap between OO objects and non-OO languages, but they have proved inadequate. One prior art approach uses visual connections depicted on a GUI to control OO objects. Several graphical composition editors are commercially available to support this type of programming, which may function adequately for very simple scenarios. However, in a real application system this approach quickly becomes a maintenance and performance nightmare. The graphical representation of the OO objects becomes cluttered with visual connections to control the OO objects directly, or to execute OO scripts to control the objects. In addition to being visually cumbersome, these visual connections cannot be driven effectively from within the business logic because there is no non-OO construct to fire the GUI visual events in amongst the other non-OO code.

Another prior art approach is the "PerformRequest" support which is provided in the IBM VisualAge® Generator (hereinafter, "VG") product. (VisualAge is a registered trademark of IBM.) This PerformRequest technique allows the VG non-OO code to set up an object to manipulate the OO objects after a business logic component has completed execution. This allows some level of mixing OO objects and non-OO programming languages, but it is inefficient and unnatural because the interaction with the OO objects does not take place during the natural flow of the business logic. Instead, the non-OO business logic must come to the end of the currently-executing component (where a component is analogous to a subroutine or function), and then control can be given over to the OO context where results of the business logic may be reflected in the objects and on the GUI. (Note: the term "context"is used herein in a general sense and not as a specific computer science term. For example, "OO world", "OO environment", and "OO context" are all intended to be synonymous.) The data used by the two parts of the system (i.e. the GUI part and the business logic part) is not synchronized, and there is therefore no way to manipulate an OO object in one business logic statement and then immediately use the results of that OO object change in the next business logic statement.

There are many situations in which the business logic code needs to directly interact with OO methods as the business logic executes, rather than awaiting completion of the invoked business logic, such that the two parts of the system can execute in an integrated manner. Prior art systems do not provide this type of integration. To illustrate the problem, suppose the business logic performs analysis or error checking of data values which an application user enters into the fields of a user interface panel. Further suppose that this analysis code is designed to display an error message window, at run-time, upon detecting a problem with any of the input data values. Preferably, each detected error would be displayed as it is detected. If the procedural business logic construct has no facility for returning control to the GUI context until all of the business logic corresponding to the invoked GUI event has completed, the error message window will not be displayed at the most appropriate time (and any related OO logic will not execute in-line, before other business logic data processing occurs). This delay between detecting an error and presenting it on the GUI, while control is forced to remain in the business logic being executed until that code completely finishes, leads to an unnatural, inefficient reflection of the results of the business logic's processing on the user interface.

In many application scenarios this non-integrated execution presents an especially undesirable approach. Suppose, in this same example, that the application allows the user to enter values of several fields into the GUI before invoking the business logic which analyzes each field value. (This approach may be useful, for example, when the value of one field dictates the allowable values of another field.) It may therefore happen that multiple error messages are generated while the business logic executes. Because the non-integrated code does not present error messages upon detection, the developer must typically provide a means for saving each generated message until all the analysis code completes, and a means for then displaying each message in sequence (preferably, in order of the business logic processing). This may be done, for example, by creating a collection or table of error messages as the procedural analysis code executes, and then iteratively processing each saved element of the created structure in the GUI code for display to the user when the analysis code is complete. However, this approach is quite cumbersome and is therefore undesirable.

Many other scenarios can be envisaged where the lack of integration between OO and non-OO parts of a system presents similar difficulties.

In the general case, developers are left with the choice of presenting this type of unnatural, unintegrated interaction to their application users, or of designing the procedural code to avoid this situation (e.g. by attempting to break the business logic into smaller components, enabling control to return to the GUI more often). The latter technique is no more desirable than the former, as it makes the coding task more difficult and yields an artificial application design which is adapted to the limitations of the execution environment, rather than toward the problem being solved by a particular application.

Accordingly, what is needed is a technique for blending object-oriented methods and procedural language code components such that they execute and share data in a seamless, integrated manner, where control efficiently passes from one to the other and avoids the problems of prior art systems. This seamless operation should be provided even though the methods and procedural components may be using different namespaces.

SUMMARY OF THE INVENTION

An object of the present invention is to provide a technique for blending object-oriented methods and procedural language code components such that they execute in a seamless, integrated manner.

Another object of the present invention is to provide this technique whereby control efficiently passes back and forth between object-oriented code execution and procedural language code execution.

Still another object of the present invention is to provide a technique for sharing data values among OO methods and procedural components which are executing in different namespaces.

A further object of the present invention is to provide a technique for synchronously invoking object-oriented methods during execution of a procedural code component, such that processing control passes seamlessly from a procedural code component to an object-oriented method and back again.

Another object of the present invention is to provide this integrated execution technique by supporting a special keyword construct that triggers invocation of a named OO method.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for seamlessly integrating execution of object-oriented methods and procedural language code components. In one aspect, this technique comprises: accessing one or more object-oriented methods written in an object-oriented programming language; accessing one or more procedural components written in a procedural programming language, wherein at least one of the procedural components contains one or more references to selected ones of the object-oriented methods, selecting, by a user of the technique, an event from a graphical user interface, wherein the event is operably associated with a selected one of the procedural components; executing the selected procedural component under control of a procedural run-time engine, responsive to the means for selecting; transferring control from the procedural run-time engine to a particular one of the object-oriented methods upon encountering one of the references in the executing procedural component, wherein the encountered reference identifies the particular one; executing the particular object-oriented method; and returning control to the procedural run-time engine upon completion of the execution of the particular object-oriented method.

The encountered reference preferably further comprises a special keyword to signify the encountered reference and a name of the particular object-oriented method, and the technique preferably further comprises performing a synchronization of data values prior to the transfer of control. The transfer of control, execution of the particular object-oriented method, and return of control preferably operate to provide a synchronous execution of the particular object-oriented method. The technique may further comprise loading data values set by the executing procedural component into sharable storage prior to the transfer of control, and accessing the loaded data values during the execution of the particular object-oriented method.

In another aspect, the technique comprises: executing one or more object-oriented methods written in an object-oriented programming language; executing one or more procedural components written in a procedural programming language; and synchronously executing a selected object-oriented method during execution of a processing path of a selected procedural component. The synchronous execution may further comprise: loading data values into sharable storage during execution of the processing path of the selected procedural component; detecting, within the processing path of the selected procedural component, a keyword-based method invocation of the selected object-oriented method; transferring execution control, upon detecting the keyword-based method invocation, from the processing path of the selected procedural component to the selected object-oriented method; executing the selected object-oriented method, upon the transfer of control; accessing the loaded data values during the execution of the selected object-oriented method; and returning execution control to the processing path of the selected procedural component. Returning execution control may operate in response to encountering an end of execution of the selected object-oriented method.

The present invention will now be described with reference to the following drawings, in which like reference numbers denote the same element throughout.

BRIEF DESCRIPTION OF THE DRAWINGS

FIGS. 3 through 5 depict sample windows and code fragments which are used to describe operation of a preferred embodiment of the present invention.

DESCRIPTION OF THE PREFERRED EMBODIMENT

Figure 1:
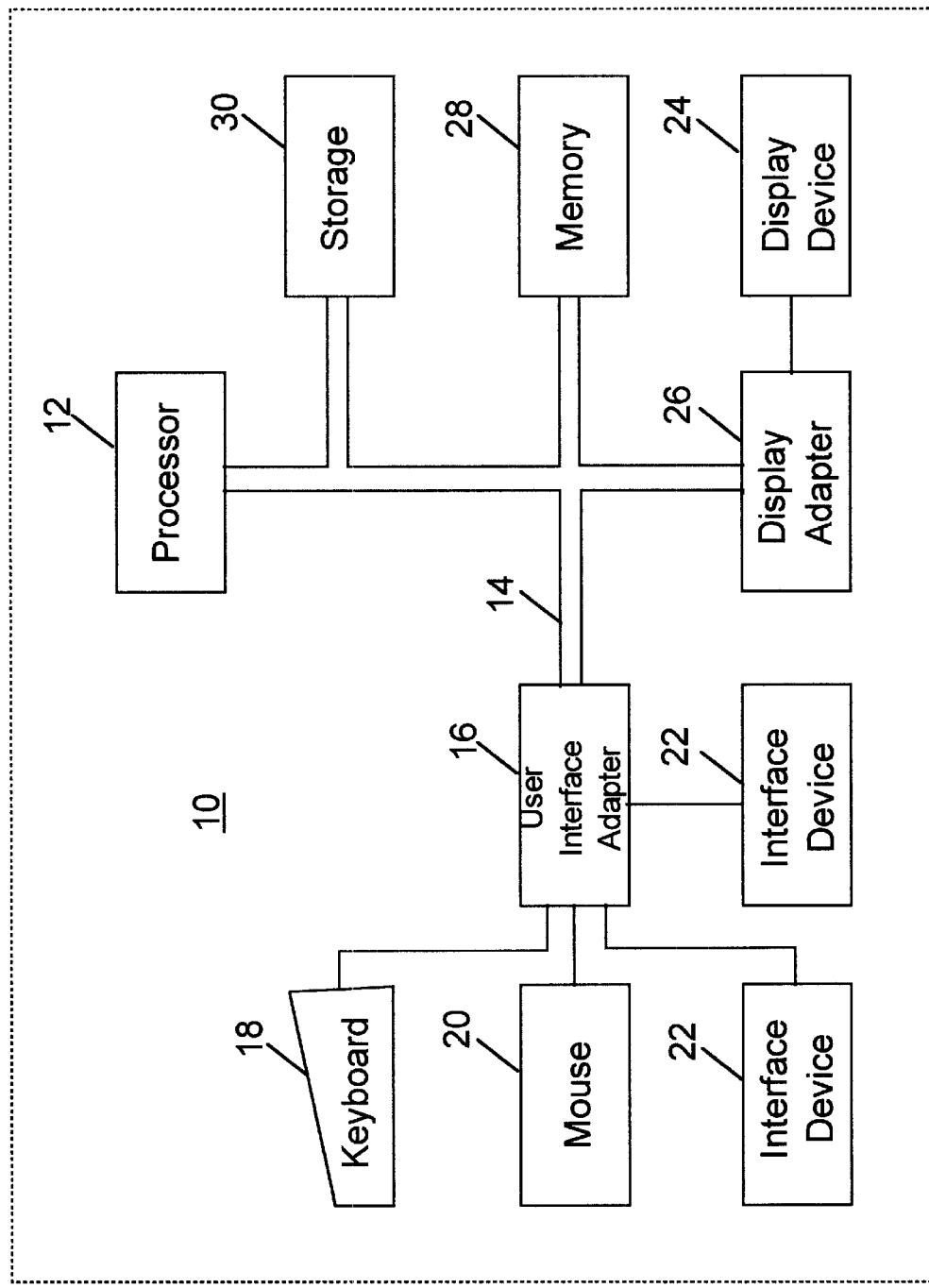
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

Software programming code which embodies the present invention is typically accessed by the microprocessor 12 of the workstation 10 from long-term storage media 30 of some type, such as a CD-ROM drive or hard drive. In a client-server networking environment (not shown), such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

In the preferred embodiment, the present invention is implemented as objects (classes and methods) in an object-oriented programming language such as Smalltalk or Java™. The invention has been implemented in the IBM VisualAge® Generator product. However, the inventive concepts disclosed herein may be used advantageously with other products and with other programming languages, whether implemented in object-oriented or procedural languages. ("Java" is a trademark of Sun Microsystems, Inc.)

The present invention provides an integrated execution environment which presents a single, logical interface while actually spanning multiple separate programming models which are based on different technologies. Further, these programming models operate in different namespaces.

A technique is provided that allows a non-OO programming language component to call out to an OO script (referred to equivalently herein as an OO method) during the natural execution flow of the non-OO logic (also referred to herein as "business logic" for purposes of illustration and not of limitation). Rather than forcing invocation of OO logic to be delayed until the non-OO component finishes execution, this call out technique enables the two parts of the system to execute in an integrated, natural, and logical manner. Data values are shared between the parts of the system during the integrated execution. According to the present invention, the OO scripts run synchronously, which means that the business logic that executes after the OO script completes can trust that the desired changes to the OO objects have already taken place.

In the preferred embodiment, this call out technique uses a special function keyword which takes as its parameter the name of the OO method to be invoked. The keyword will be referred to herein as "EZESCRPT". A OO method invocation from within a non-OO component thus takes the form:

EZESCRPT (method_name)

where this statement is used as a stand-alone processing statement within the non-OO component. Encountering this statement in an executing business logic component causes the immediate synchronous execution of the named method. In the preferred embodiment, data values to be passed to the OO script are loaded into a predetermined area of commonly-addressable storage to avoid the need for passing parameters.

In the VG implementation, the EZESCRPT statement may be used in any function that is placed on the free-form GUI surface and which is invoked from a Smalltalk or Java GUI. VG is made up of both data and logic components. Data components include records and tables which describe information read from database records and internal data elements required to control the application system. Logic components include programs and functions. Functions are the basic code building blocks and contain the VG processing statements used to code the business logic for the application system. Both data and logic components can be placed on the free-form surface of a GUI.

The manner in which the preferred embodiment of the present invention operates will now be discussed with reference to FIGS. 2 through 5.

Figure 2:
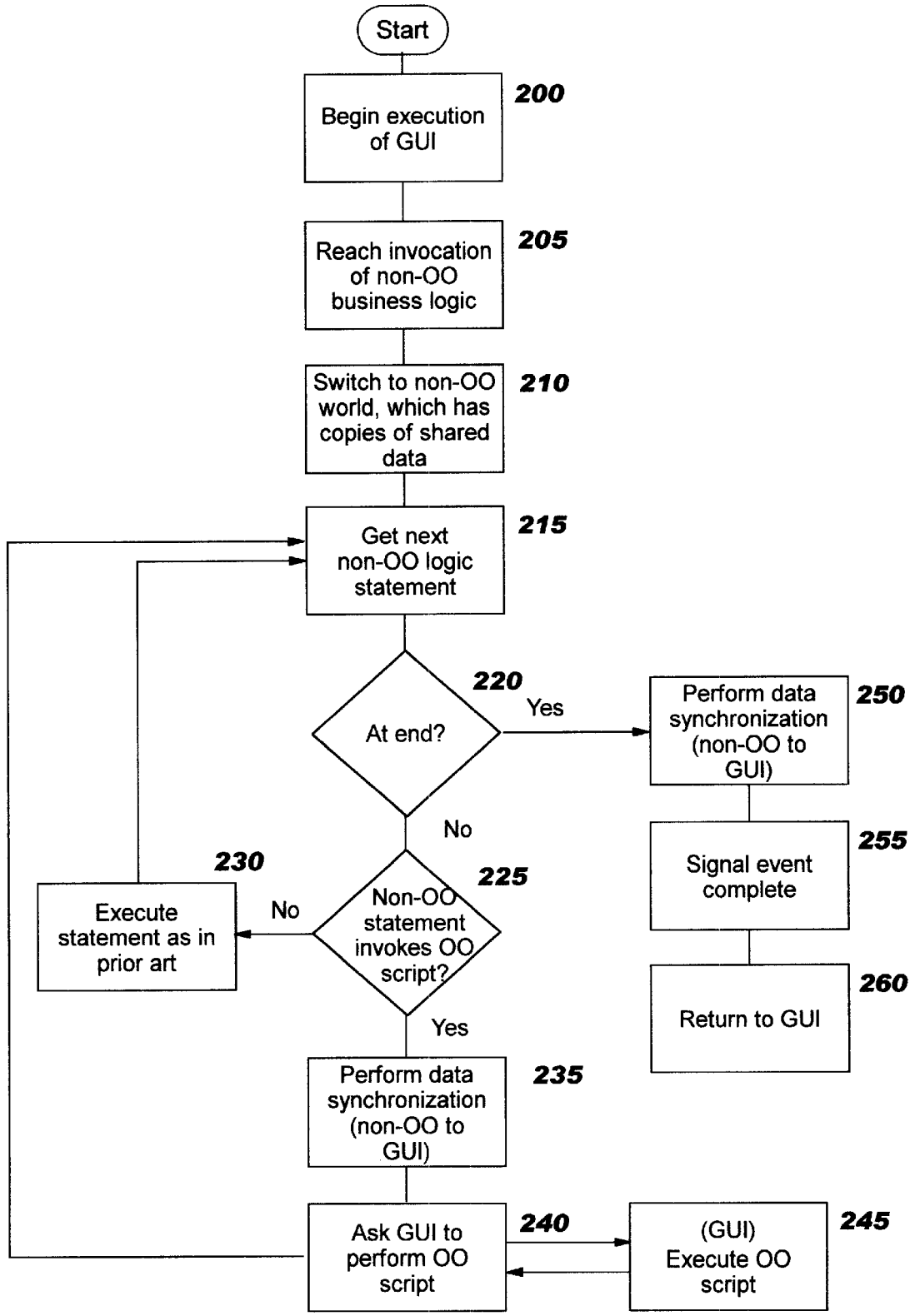
FIG. 2 illustrates a flowchart depicting logic that may be used to implement a preferred embodiment of the present invention.

FIG. 2 depicts the logic that may be used to implement a preferred embodiment of the present invention. This logic begins at Block 200, where a GUI is in control as an application begins (or continues) execution. At some point, non-OO business logic is invoked (e.g by the application user clicking on an icon, such as icon 301 of FIG. 3 which represents a pushbutton GUI object) corresponding to execution of a procedural logic component (referred to equivalently herein as a "logic part") from the user interface (Block 205). Processing control then switches to the non- OO world (Block 210), using techniques which are known in the art. The non-OO context has its own copies of the data that is to be shared between the OO scripts and the non-OO components, in its own namespace, also using prior art techniques. (Data values changed within the OO context are automatically made available to the non-OO context. An explicit synchronization, described below with reference to Block 235, is disclosed by the present invention to enable data values changed within the non-OO context to be available to the OO context.)

Referring now to FIG. 3, an example GUI screen 300 is depicted from which a procedural language component (such as element 400 of FIG. 4A) can be invoked, for example by clicking on icon 301 after entering data into fields 310 and 320. In this example, the user has entered a Name 310 of "Mary" and an Age 320 of "199". Assume the user then presses the Update button 301 to cause updating of a stored data value of some sort. FIG. 4A shows an example of a business logic component that may be invoked in response to this Update 301 button, where this function 400 validates the entered age and name values. This non-OO code fragment 400 (written in a COBOL-like programming syntax) analyzes data values entered into fields of a customer record such as that depicted in FIG. 3. By inspection, it can be seen that programming statements 405, 410 test upper and lower bounds on a customer's age. If an error is detected according to these bounds, statements 415 and 420 initialize fields to be used in an error message according to the present invention. The EZESCRPT statement 425 then causes the OO method "displayError" to be invoked. (An example of the OO code that may be used for the display-Error method is shown in FIG. 4B. This OO script will be discussed in more detail below.) Programming statement 435 continues the procedural language component, upon returning from the displayError method (or when no error was detected, and the method invocation was bypassed), by performing an analysis of the customer name field. If the name has been left blank, statements 440 and 445 initialize an appropriate error message, and statement 450 again invokes the displayError method.

Returning now to FIG. 2, the manner in which the present invention enables the business logic function in FIG. 4A to execute in an integrated manner with the OO script of FIG. 4B, immediately and synchronously informing a user through a GUI display of a processing result of non-OO business logic (in this case, the detected error in the Age value), will now be described.

Block 215 begins a process of obtaining and iteratively executing statements from the non-OO component, according to the logic programmed in the particular component. The statements are monitored for occurrence of the special keyword construct. Block 220 first checks to see if the invoked non-OO component has completed. If so, control transfers to Block 250 (discussed below). Otherwise, Block 225 checks to see if the statement to be executed is the special keyword, indicating that an OO script is to be invoked. When this test has a negative result, the statement is processed normally (Block 230), after which control returns to Block 215. (For example, statements 405 through 420 of FIG. 4A are executed as in the prior art.)

Control reaches Block 235 when an OO script invocation has been encountered within the non-OO component (such as statement 425 of the example in FIG. 4A). To enable the GUI to accurately reflect the results of processing in the non-OO context (e.g. displaying an error message that knows about the particular error that has just been detected at statement 410), Block 235 performs a synchronization process wherein the data values maintained in the non-OO context are copied to (or otherwise made available to) the GUI context. Because the OO scripts and non-OO business logic execute with different namespaces, the non-OO functions have no knowledge of GUI parts such as buttons and text fields, and the OO script has no automatic knowledge of the data components used in the business logic. A mechanism is therefore provided by the present invention to enable sharing of data objects between the OO and non-OO contexts. Since the non-OO data parts can be placed on the free-form surface of the GUI, they can be treated like OO objects in OO scripts (using prior art techniques). The preferred embodiment of the present invention therefore uses this technique to enable a non-OO data part such as a record to be treated as an object, automatically giving access to the record's data to an executing OO script. Preferably, the information to be used by the invoked OO script is stored in, or modified in, the record prior to invoking an OO script using the EZESCRPT statement. The OO script can then access the data. Likewise, the OO scripts can modify record or table parts prior to returning control to the non-OO context. The business logic statements following the EZESCRPT statement invocation then have automatic access to the modified information.

The present invention performs this explicit synchronization process before returning control to the GUI in order to maintain control over the execution path. That is, without this explicit technique, changes made within the non-OO context might trigger a GUI event (e.g. as a data value is moved into a record, thereby causing the record to change); this is an undesirable side effect of execution within the non-OO context, and is therefore avoided according to the technique of the present invention.

Statements 415, 420 of FIG. 4A show one way in which the information in the record can be set up to inform the OO script of data values set by the business logic component that are to be used as the OO script executes. In this example, the business logic sets an identifier of the field which is in error (statement 415) and also provides text of an error message (statement 420), where these are the FIELD and MESSAGE entries in a predefined record named CUSTOMER. Other fields, which are known by name to both the non-OO code and the OO code, may be used in an equivalent manner to that depicted for FIELD and MESSAGE. (See statements 460, 465 of the OO script in FIG. 4B of this example, which are written to expect input information in these fields name FIELD and MESSAGE within the record named CUSTOMER.)

Returning again to FIG. 2, Block 240 then asks the GUI to perform the OO script. As the OO script executes, it can control the OO objects within the GUI context. As an example, the OO script may perhaps handle numerous user interface events according to the processing which has just occurred in the business logic component. In the case of the displayError script in FIG. 4B, the OO script executes to indicate an error in the user's input. Statements 460 and 465 are written to obtain the identification of the field in error and the text of the error message from the fields named FIELD and MESSAGE in the CUSTOMER data part, the values of which have been set in the non-OO procedural code at statements 415 and 420 of FIG. 4A, and which are shared between that non-OO code and the OO code as described above. Statement 470 then changes the background color of the field which is in error to red. Statements 475 and 480 display an error message prompt, and wait for the user to respond to the message, respectively, after which control will return (in this example) to statement 430 of the procedural code component 400.

Figure 5:
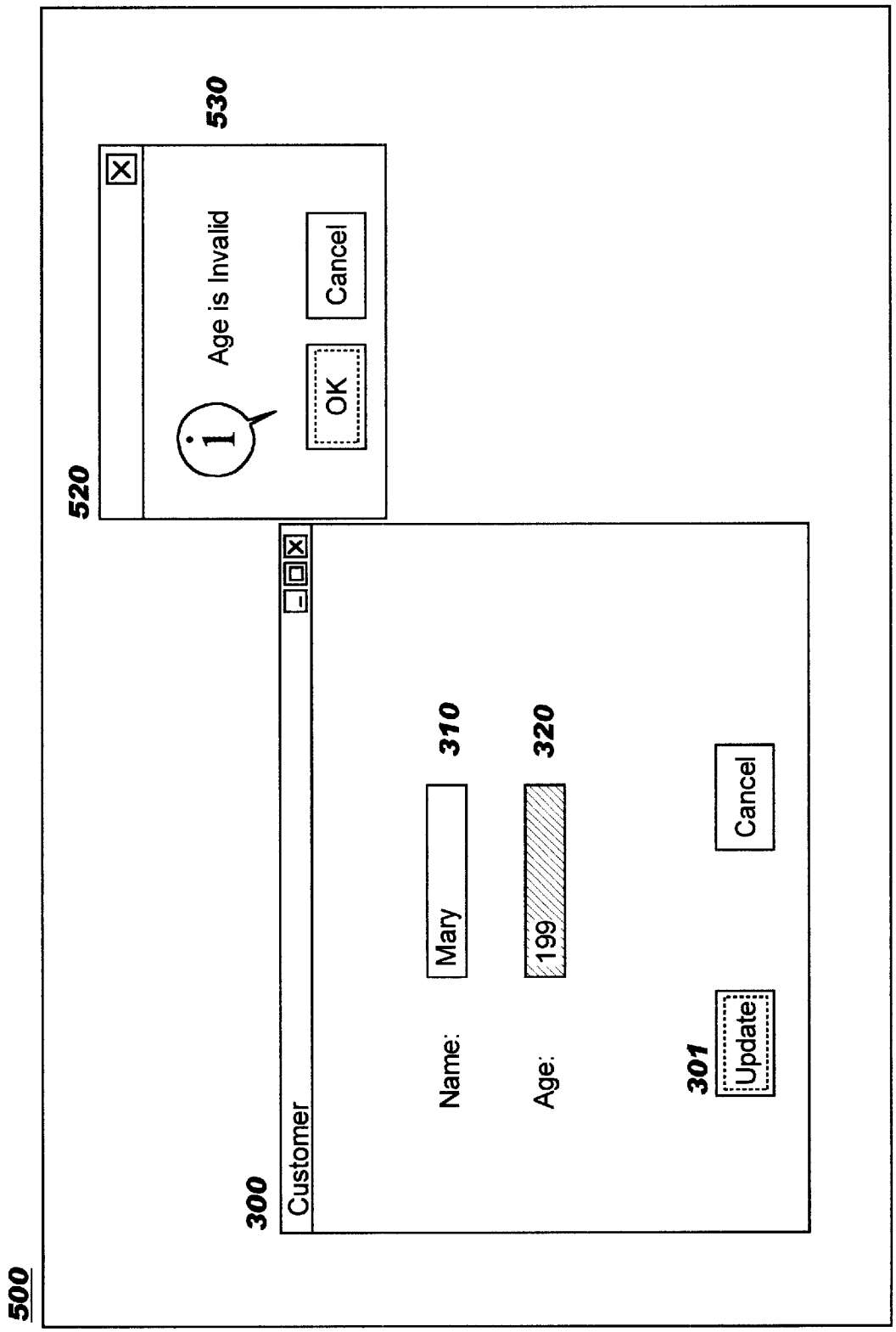

FIG. 5 depicts an example of executing the logic of FIGS. 4A and 4B with the input data shown in FIG. 3. The user's input values from FIG. 3 are shown in the input window 300, where the background color for the Age entry field 320 has been highlighted (in red, for this example) to show the user where the error is located. A message prompter 520 is also displayed on GUI 500, where error message 530 has been set by OO script statement 420.

Note that the OO script might also have contained an invocation of a procedural language component (either the same component 400 of FIG. 4A, or a different code component), where that code component may have had its own OO script invocation(s). In this situation, the logic of FIG. 2 is invoked anew for the procedural component, beginning at Block 205.

When the OO script completes, control returns from Block 245 to Block 240, and from there to Block 215. Upon returning to Block 215, execution seamlessly resumes with the processing statement following the special function keyword (statement 430 of FIG. 4A, in this example).

Control reaches Block 250 when the business logic component completes execution. Before returning control to the OO context, Block 250 performs a synchronization of data values between the non-OO and GUI contexts, enabling the GUI to have access to the most current values representing the business logic execution (as described above with reference to Block 235). Block 255 then signals that the non-OO event is complete, thereby enabling any further GUI events triggered from that event to fire. Block 260 then returns control to the OO context (and processing resumes according to Block 200 FIG. 2), and the logic of FIG. 2 then awaits the next non-OO invocation (which may occur by the user initiating a GUI event, or as a method-driven invocation from an OO script).

Thus, it can be seen from the descriptions above (with reference to the simple example of FIGS. 3–5) that OO script processing is invoked in-line according to the present invention, enabling OO scripts and procedural code to execute and share data seamlessly in an integrated, natural manner. Two separate programming models, which are based on different technologies and operate in different namespaces, not only co-exist but execute cooperatively. The synchronous invocation of OO scripts from within non-OO business logic provides a logical and efficient blending of OO objects with traditional programming languages.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for seamlessly integrating execution of an object-oriented programming language and a procedural programming language, the computer program product embodied one or more computer-readable media and comprising:

computer-readable program code means for selecting, by a user of the computer program product, an event from a graphical user interface, wherein the event is operably associated with a selected one of one or more procedural components written in the procedural programming language, and wherein at least one of the procedural components contains an invocation of at least one of one or more object-oriented methods written in the object-oriented language;

computer-readable program code means for executing the selected procedural component under control of a procedural run-time engine, responsive to the computer-readable program code means for selecting;

computer-readable program code means for detecting, during execution of the selected procedural component, each of the invocations, along with a particular one of the object-oriented methods identified by the detected invocation;

computer-readable program code means for performing, responsive to the computer-readable program code means for detecting, a synchronization of data values used by the executing selected procedural component such that they are available to the particular one of the object-oriented methods, without requiring the selected procedural component to obtain a handle of the particular object-oriented method or of constructs identifying the data values;

computer-readable program code means for transferring control from the procedural run-time engine to the particular one of the object-oriented methods, responsive to the computer-readable program code means for performing;

computer-readable program code means for executing the particular object-oriented method under control of an object-oriented run-time engine, responsive to the computer-readable program code means for transferring control; and computer-readable program code means for returning control from the object-oriented run-time engine to the procedural run-time engine upon completion of the execution of the particular object-oriented method.

2. The computer program product according to claim 1, wherein each invocation is specified using a special keyword syntax.

3. The computer program product according to claim 2, wherein the procedural run-time engine and the object-oriented method use different namespaces.

4. The computer program product according to claim 1, wherein the computer-readable program code means for transferring control, the computer-readable program code means for executing the particular object-oriented method, and the computer-readable program code means for returning control operate to synchronize execution of the particular object-oriented method with execution of the selected procedural component.

5. The computer program product according to claim 1, wherein the computer-readable program code means for performing further comprises:

computer-readable program code means for loading data values set by the executing procedural component into shareable storage prior to operation of the computer-readable program code means for transferring control; and computer-readable program code means for accessing the loaded data values, by the particular object-oriented method, during operation of the computer-readable program code means for executing the particular object-oriented method.

6. A computer program product for executing object-oriented methods and procedural programming language components and sharing data between the methods and the components, the computer program product embodied one or more computer-readable media and comprising:

computer-readable program code means for executing, in an object-oriented run-time engine, one or more object-oriented methods written in an object-oriented programming language;

computer-readable program code means for executing, in a procedural run-time engine, one or more procedural components written in a procedural programming language; and computer-readable program code means for synchronously executing a selected object-oriented method during execution of a processing path of a selected procedural component, wherein data values set by the selected procedural component are available to the selected object-oriented method without requiring parameter passing from the selected procedural component to the selected object-oriented method.

7. The computer program product according to claim 6, wherein the computer-readable program code means for synchronously executing further comprises:

computer-readable program code means for loading the data values into shareable storage during execution of the processing path of the selected procedural component, thereby avoiding the parameter passing;

computer-readable program code means for detecting, within the processing path of the selected procedural component, a keyword-based method invocation of the selected object-oriented method;

computer-readable program code means for transferring execution control, upon detecting the keyword-based method invocation, from the processing path of the selected procedural component to the selected object-oriented method;

computer-readable program code means for executing the selected object-oriented method, upon the transfer of control;

computer-readable program code means for accessing the loaded data values during the execution of the selected object-oriented method; and computer-readable program code means for returning execution control to the processing path of the selected procedural component.

8. The computer program product according to claim 7, wherein the computer-readable program code means for returning execution control operates in response to encountering an end of execution of the selected object-oriented method.

9. A system for seamlessly integrating execution of an object-oriented programming language and a procedural programming language, comprising:

means for selecting, by a user of the system, an event from a graphical user interface, wherein the event is operably associated with a selected one of one or more procedural components written in the procedural programming language, and wherein at least one of the procedural components contains an invocation of at least one of one or more object-oriented methods written in the object-oriented language;

means for executing the selected procedural component under control of a procedural run-time engine, responsive to the means for selecting;

means for detecting, during execution of the selected procedural component, each of the invocations, along with a particular one of the object-oriented methods identified by the detected invocation;

means for performing, responsive to the means for detecting, a synchronization of data values used by the executing selected procedural component such that they are available to the particular one of the object-oriented methods, without requiring the selected procedural component to obtain a handle of the particular object-oriented method or of constructs identifying the data values;

means for transferring control from the procedural run-time engine to the particular one of the object-oriented methods, responsive to the means for performing;

means for executing the particular object-oriented method under control of an object-oriented run-time engine, responsive to the means for transferring control; and means for returning control from the object-oriented run-time engine to the procedural run-time engine upon completion of the execution of the particular object-oriented method.

10. The system according to claim 9, wherein each invocation is specified using a special keyword syntax.

11. The system according to claim 10, wherein the procedural run-time engine and the object-oriented method use different namespaces.

12. The system according to claim 9, wherein the means for transferring control, the means for executing the particular object-oriented method, and the means for returning control operate to synchronize execution of the particular object-oriented method with execution of the selected procedural component.

13. The system according to claim 9, wherein the means for performing further comprises:

means for loading data values set by the executing procedural component into shareable storage prior to operation of the means for transferring control; and means for accessing the loaded data values, by the particular object-oriented method, during operation of the means for executing the particular object-oriented method.

14. A system for executing object-oriented methods and procedural programming language components and sharing data between the methods and the components, comprising:

means for executing, in an object-oriented run-time engine, one or more object-oriented methods written in an object-oriented programming language;

means for executing, in a procedural run-time engine, one or more procedural components written in a procedural programming language; and means for synchronously executing a selected object-oriented method during execution of a processing path of a selected procedural component, wherein data values set by the selected procedural component are available to the selected object-oriented method without requiring parameter passing from the selected procedural component to the selected object-oriented method.

15. The system according to claim 14, wherein the means for synchronously executing further comprises:

means for loading the data values into shareable storage during execution of the processing path of the selected procedural component, thereby avoiding the parameter passing;

means for detecting, within the processing path of the selected procedural component, a keyword-based method invocation of the selected object-oriented method;

means for transferring execution control, upon detecting the keyword-based method invocation, from the processing path of the selected procedural component to the selected object-oriented method;

means for executing the selected object-oriented method, upon the transfer of control;

means for accessing the loaded data values during the execution of the selected object-oriented method; and means for returning execution control to the processing path of the selected procedural component.

16. The system according to claim 15, wherein the means for returning execution control operates in response to encountering an end of execution of the selected object-oriented method.

17. A method for seamlessly integrating execution of an object-oriented programming language and a procedural programming language, comprising the steps of:

selecting, by a user of the method, an event from a graphical user interface, wherein the event is operably associated with a selected one of one or more procedural components written in the procedural programming language, and wherein at least one of the procedural components contains an invocation of at least one of one or more object-oriented methods written in the object-oriented language;

executing the selected procedural component under control of a procedural run-time engine, responsive to the selecting step;

detecting, during execution of the selected procedural component, each of the invocations, along with a particular one of the object-oriented methods identified by the detected invocation;

performing, responsive to the detecting step, a synchronization of data values used by the executing selected procedural component such that they are available to the particular one of the object-oriented methods, without requiring the selected procedural component to obtain a handle of the particular object-oriented method or of constructs identifying the data values;

transferring control from the procedural run-time engine to the particular one of the object-oriented methods, responsive to the performing step;

executing the particular object-oriented method under control of an object-oriented run-time engine, responsive to the transferring control step; and returning control from the object-oriented engine to the procedural run-time engine upon completion of the execution of the particular object-oriented method.

18. The method according to claim 17, wherein each invocation is specified using a special keyword syntax.

19. The method according to claim 18, wherein the procedural run-time engine and the object-oriented method use different namespaces.

20. The method according to claim 17, wherein the steps of transferring control, executing the particular object-oriented method, and returning control operate to synchronize execution of the particular object-oriented method with execution of the selected procedural component.

21. The method according to claim 17, wherein the performing step further comprises the steps of:

loading data values set by the executing procedural component into shareable storage prior to operation of the transferring control step; and accessing the loaded data values, by the particular object-oriented method, during operation of the step of executing the particular object-oriented method.

22. A method for executing object-oriented methods and procedural programming language components and sharing data between the methods and the components, comprising the steps of:

executing, in an object-oriented run-time engine, one or more object-oriented methods written in an object-oriented programming language;

executing, in a procedural run-time engine, one or more procedural components written in a procedural programming language; and synchronously executing a selected object-oriented method during execution of a processing path of a selected procedural component, wherein data values set by the selected procedural component are available to the selected object-oriented method without requiring parameter passing from the selected procedural component to the selected object-oriented method.

23. The method according to claim 22, wherein the step of synchronously executing further comprises the steps of:

loading data values into shareable storage during execution of the processing path of the selected procedural component, thereby avoiding the parameter passing;

detecting, within the processing path of the selected procedural component, a keyword-based method invocation of the selected object-oriented method;

transferring execution control, upon detecting the keyword-based method invocation, from the processing path of the selected procedural component to the selected object-oriented method;

executing the selected object-oriented method, upon the transfer of control;

accessing the loaded data values during the execution of the selected object-oriented method; and returning execution control to the processing path of the selected procedural component.

24. The method according to claim 23, wherein the step of returning execution control operates in response to encountering an end of execution of the selected object-oriented method.

* * * * *